United States Patent
Busaba et al.

(10) Patent No.: US 9,104,399 B2
(45) Date of Patent: Aug. 11, 2015

(54) DUAL ISSUING OF COMPLEX INSTRUCTION SET INSTRUCTIONS

(75) Inventors: Fadi Busaba, Poughkeepsie, NY (US);
Brian Curran, Saugerties, NY (US);
Lee Eisen, Round Rock, TX (US);
Christian Jacobi, Poughkeepsie, NY (US); David A. Schroter, Round Rock, TX (US); Eric Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 12/645,716

(22) Filed: Dec. 23, 2009

(65) Prior Publication Data

US 2011/0153991 A1    Jun. 23, 2011

(51) Int. Cl.
| | |
|---|---|
| *G06F 15/00* | (2006.01) |
| *G06F 9/30* | (2006.01) |
| *G06F 9/40* | (2006.01) |
| *G06F 9/38* | (2006.01) |

(52) U.S. Cl.
CPC ............ *G06F 9/3001* (2013.01); *G06F 9/3017* (2013.01); *G06F 9/30043* (2013.01); *G06F 9/3836* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 4,604,684 A | 8/1986 | Epstein | |
| 4,847,755 A * | 7/1989 | Morrison et al. | 712/203 |
| 4,853,840 A | 8/1989 | Shibuya | |
| 4,858,104 A | 8/1989 | Matsuo et al. | |
| 4,873,629 A | 10/1989 | Harris et al. | |
| 5,073,855 A | 12/1991 | Staplin et al. | |
| 5,150,468 A | 9/1992 | Staplin et al. | |
| 5,434,985 A | 7/1995 | Emma et al. | |
| 5,500,947 A | 3/1996 | Uhler et al. | |

(Continued)

FOREIGN PATENT DOCUMENTS

| | | |
|---|---|---|
| EP | 0 378 816 A2 | 12/1989 |
| EP | O-374830 A3 | 3/1992 |

(Continued)

OTHER PUBLICATIONS

Michael J, Flynn. Instruction Sets and Their Implementations. IEEE . . . EE Department, CSL. Stanford, CA. 12-27 to 12-29, 1990.

(Continued)

*Primary Examiner* — George Giroux
(74) *Attorney, Agent, or Firm* — Fleit Gibbons Gutman Bongini & Bianco PL; Thomas Grzesik (57) ABSTRACT

A system and method for issuing a processor instruction to multiple processing sections arranged in an out-of-order processing pipeline architecture. The multiple processing sections include a first execution unit with a pipeline length and a second execution unit operating upon data produced by the first execution unit. An instruction issue unit accepts a complex instruction that is cracked into respective micro-ops for the first execution unit and the second execution unit. The instruction issue unit issues the first micro-op to the first execution unit to produce intermediate data. The instruction issue unit then delays for a time period corresponding to the processing pipeline length of the first execution unit. After the delay, a second micro-op is issued to the second execution unit.

19 Claims, 4 Drawing Sheets

(56) References Cited

U.S. PATENT DOCUMENTS

| | | | |
|---|---|---|---|
| 5,666,506 A | 9/1997 | Hesson et al. | |
| 5,694,565 A | 12/1997 | Kahle et al. | |
| 5,717,910 A | 2/1998 | Henry | |
| 5,742,805 A | 4/1998 | Kulkarni et al. | |
| 5,752,273 A | 5/1998 | Nemirovsky et al. | |
| 5,781,752 A | 7/1998 | Moshovos et al. | |
| 5,826,089 A | 10/1998 | Ireton | |
| 5,867,684 A | 2/1999 | Kahle et al. | |
| 5,909,567 A | 6/1999 | Novak et al. | |
| 6,134,646 A | 10/2000 | Feiste et al. | |
| 6,219,742 B1 | 4/2001 | Stanley | |
| 6,336,183 B1 | 1/2002 | Le et al. | |
| 6,609,190 B1* | 8/2003 | Kahle et al. | 712/214 |
| 6,609,191 B1* | 8/2003 | Hooker et al. | 712/216 |
| 6,654,869 B1 | 11/2003 | Kahle et al. | |
| 6,697,939 B1 | 2/2004 | Kahle | |
| 6,999,952 B1 | 2/2006 | Pham | |
| 7,082,517 B2 | 7/2006 | Busaba et al. | |
| 7,085,917 B2 | 8/2006 | Busaba et al. | |
| 7,159,102 B2 | 1/2007 | Irie et al. | |
| 7,162,621 B2 | 1/2007 | Kissell | |
| 7,269,715 B2 | 9/2007 | Le et al. | |
| 2002/0152259 A1 | 10/2002 | Trong et al. | |
| 2005/0060518 A1* | 3/2005 | Augsburg et al. | 712/214 |
| 2005/0223292 A1 | 10/2005 | Lee et al. | |
| 2006/0053343 A1 | 3/2006 | Hayem | |
| 2008/0229077 A1* | 9/2008 | Sathaye | 712/216 |
| 2008/0270749 A1* | 10/2008 | Ozer et al. | 712/23 |
| 2009/0210659 A1 | 8/2009 | Carlough et al. | |
| 2009/0240914 A1 | 9/2009 | Malley et al. | |
| 2009/0240919 A1 | 9/2009 | Alexander et al. | |
| 2010/0058035 A1* | 3/2010 | Abernathy et al. | 712/217 |

FOREIGN PATENT DOCUMENTS

| | | |
|---|---|---|
| JP | 2000259408 A | 9/2000 |
| JP | 2001229024 A2 | 8/2001 |
| JP | 2004342102 A2 | 12/2004 |

OTHER PUBLICATIONS

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

Gideon D, Intrater and Iian Y. Spikkinger. Performance Evaluation of a Decoded Instruction Cache for Variable Instruction Length Computers. IEEE. Oct. 2004.

Abraham Ziv and Merav Aharoni and Sigal Asaf, Solving Range Constraints for Binary Floating-Point Instructions, Haifa University, 2003, IBM Research Labs, Haifa, Israel.

Fadi Busaba and Timothy Slegel and Steven Carlough and Christopher Krygowski and John G. Rell, The Design of the Fixed Point Unit for the z990 Microprocessor, GLSVLSI '04, 2004, Boston.

Gang Quan and James P. Davis and Siddhaveerasharan Devarkal and Duncan A. Buell, High-Level Synthesis for Large Bit-Width Multipliers on FPGAs: A Case Study, 2005, Codes+ISSS '05, Jersey City.

Jose Rizo-Morente and Miguel Casas-Sanchez and C.J. Bleakley, Dynamic Current Modeling at the Instruction Level, 2006, ISLPED '06, Tegernsee, Germany.

* cited by examiner

DUAL ISSUING OF COMPLEX INSTRUCTION SET INSTRUCTIONS

FIELD OF THE INVENTION

The present invention generally relates to managing instruction execution in a pipelined complex instruction set computer processor, and more particularly relates to managing micro-operations corresponding to certain complex instruction set instructions.

BACKGROUND OF THE INVENTION

Many performance computing processors are often able to accept Complex Instruction Set Computer (CISC) instruction or opcodes. Certain high performance computing processors perform the processing associated with certain CISC instructions by executing multiple Reduced Instruction Set Computer (RISC) instructions or opcodes that perform the required processing. Such processors "crack" the CISC instruction into multiple RISC instructions, which are referred to as "micro-ops" or µOps, that are processed by the RISC processing core of that processor. Normally cracking yields improved performance since it better utilizes the execution unit resources and it allows the micro-ops to execute out of order which makes their results available to other dependent ops earlier.

Cracking CISC instructions into multiple RISC instructions increases the complexity of performing the cracked CISC instruction in processor architectures that pipeline RISC micro-op instruction execution. When a single CISC instruction is cracked into multiple RISC micro-op instructions, those multiple micro-op instructions often have dependencies that must be tracked so that they are executed in the required order. An example of a CISC instruction that is cracked into RISC micro-ops are RX instructions of the zGryphon processor produced by International Business Machines (IBM), Inc. of Armonk, N.Y. RX instructions are arithmetic instructions with one storage operand and one register operand where one operand is sourced from storage and another operand is sourced from a register. The zGryphon processor, for example, cracks RX instructions into a RISC load operation and a RISC mathematic operation. The RISC mathematics operation is, for example, executed by a Fixed Point Unit (FXU) or a Floating Point Unit (FPU) with data produced by the load operation. This results in the mathematics operation being dependent upon the load operation and these micro-ops are required to execute in order. An architecture with parallel pipelined processing paths to execute RISC instruction that simply issues the two micro-ops corresponding to the RX instruction cracking RX ops at decode can degrade processor performance since two target (physical) registers and two issue queue entries are assigned. Both the issue queue and physical registers are frequency (and thus performance) limiting structures. Other CISC instructions with various addressing modes are able to be similarly processed.

Therefore, a more efficient cracking architecture for instructions in out-of-order computer processors is required to improve the performance of such processors.

SUMMARY OF THE INVENTION

In one embodiment, a method for issuing a processor instruction to multiple processing sections includes accepting, at an instruction issue unit within a processor, an instruction that is to be issued as a first micro-op to a first execution unit of the processor and a second micro-op two a second execution unit of the processor. The first micro-op causing the first execution unit to determine intermediate data to be provided to the second execution unit for use in executing the second micro-op. The processor comprising an out-of-order processing pipeline architecture. The method additionally includes issuing, by the instruction issue unit in response to accepting the instruction, the first micro-op to the first execution unit. The method further includes delaying, by the instruction issue unit, for a predetermined processing time period corresponding to an expected time for the first execution unit to execute the first micro-op. The method additionally includes executing the first micro-op by the first execution unit to produce the intermediate data and issuing, by the instruction issue unit subsequent to the delaying, the second micro-op to the second execution unit. The method further includes executing, upon completion of executing the first micro-op by the first execution unit, the second micro-op by the second execution unit using the intermediate data. The method also includes producing, by the processor, a result produced by the executing the second micro-op.

In another embodiment, a system for issuing a processor instruction to multiple processing sections includes a first execution unit of a processor having a pre-determined processing pipeline length and capable of executing a first micro-operations code corresponding to a complex instruction for the processor. The system further includes a second execution unit of the processor that is separate from the first execution unit and capable of executing a second micro-op corresponding to the complex instruction and operating upon data retrieved based upon the first micro-op. The first execution unit and the second execution unit being arranged in an out-of-order processing pipeline architecture. The system additionally includes an instruction issue unit coupled to the first execution unit and the second execution unit. The instruction issue unit accepts the complex instruction for the processor, the complex instruction includes a first operand with a register operand associated with a register of the processor, and a second operand with a memory location within memory accessible by the processor. The instruction issue unit further issues, to the first execution unit, the first micro-op corresponding to the complex instruction so as to cause the first execution unit to produce intermediate data, delays for a pre-determined processing time period corresponding to an expected time for the first execution unit to execute the first micro-op, and issues, subsequent to the delaying, an second micro-op to the second execution unit so as to cause the second execution unit to use the intermediate data to produce a result. The system further includes a data output producing the result.

In another embodiment, a computer program product for issuing a processor instruction to multiple processing sections includes a computer readable storage medium having computer readable program code embodied therewith. The computer readable program code includes computer readable program code configured to accept an instruction that is to be issued as a first micro-op to a first execution unit of the processor and a second micro-op to a second execution unit of the processor. The first micro-op causing the first execution unit to determine intermediate data to be provided to the second execution unit for use in executing the second micro-op. The processor comprising an out-of-order processing pipeline architecture. The computer readable program code also includes computer readable program code configured to issue the first micro-op to the first execution unit and computer readable program code configured to delay for a predetermined processing time period corresponding to an expected time for the first execution unit to execute the first micro-op. The computer readable program code also includes computer readable program code configured to execute the first micro-op by the first execution unit to produce the intermediate data and computer readable program code configured to issue, subsequent to the delaying, the second micro-op to the second execution unit. The computer readable program code additionally includes computer readable program code configured to execute, upon completion of executing the first micro-op by the first execution unit, the second micro-op by the second execution unit using the intermediate data. The computer readable program code also includes computer readable program code configured to produce a result produced by the executing the second micro-op.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Presented is a type of instruction cracking of CISC instructions, or "complex" instructions, in which micro-ops are issued to multiple execution units of a processor. The presented instruction cracking technique is referred to herein as "dual issue" processing since two micro-ops are issued to respective execution units within a processor in response to the received CISC instruction. The presented instruction cracking is useful for CISC instructions that are executed by issuing a first micro-op to a first execution unit to produce intermediate data that is used by a second execution unit in the execution of a second micro-op that is issued to implement the CISC instruction. One example of such a CISC instruction is RX instructions belonging to the z/Architecture. Further types of instructions are also able to use the presented instruction cracking.

In the example of an RX instruction, the RX instruction is fetched and decoded and a single target register and issue queue entry is assigned by the Issue Unit (ISU). In one embodiment, the issue queue includes a "dual issue control bit" that causes the RX instruction to be first issued to Load/Store Unit (LSU) when all the instructions operands (B, X and R1) are available and this instruction is the oldest ready to issue instruction. Upon execution of the RX instruction by the LSU, the LSU performs the corresponding RISC micro-op, i.e., a load op, that writes the load source operand into the target register. This operation uses the target register as temporary storage. The ISU of one embodiment "counts" a specified number of cycles before waking the second micro-op corresponding that is performed by the proper arithmetic unit, such as the FXU 110 or the FPU 112. The count by which the execution of the mathematical operation is delayed is equal to the load pipe length. In one embodiment incorporated within a zGryphon processor, the load pipe length is four cycles. This second micro-op, i.e., the FXU 110 or the FPU 112 micro-op, issues as soon as it becomes the oldest ready to issue FXU/FPU op. The operands of the second micro-op are R1 and the target register (i.e. load operand) and the second micro-op writes its results back into the target register. Thus, the RX instruction is effectively cracked at issue time with a single dispatch step.

Figure 1:
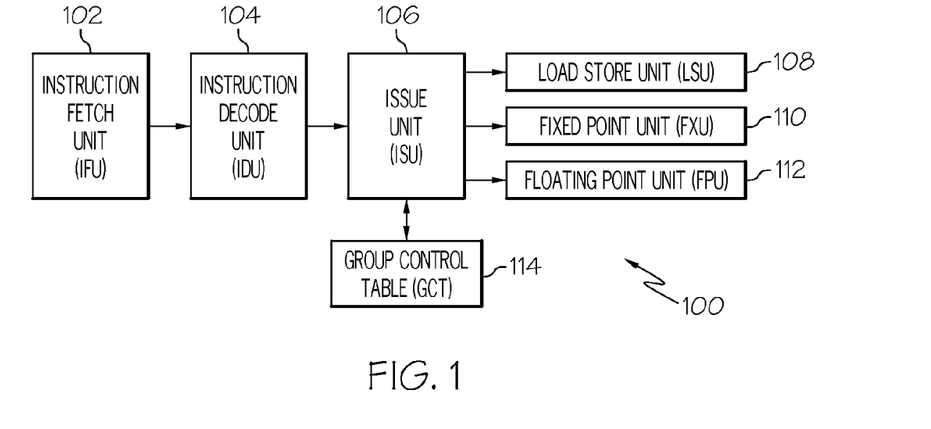
FIG. 1 illustrates a processing architecture of a processor that executes CISC instructions by cracking them into two RISC instructions, in accordance with one embodiment of the present invention.

FIG. 1 illustrates a processing architecture of a processor 100 that executes CISC instructions by cracking them into two RISC instructions, in accordance with one embodiment of the present invention. One example complex instruction is an RX instruction, but the processor 100 is able to execute a number of CISC instructions that are able to be cracked similarly to the RX instruction described above. The processor 100 includes an Instruction Fetch Unit (IFU) 102 that fetches CISC instructions to be executed. The IFU 102 provides the instructions to an Instruction Decode Unit (IDU) 104 that decodes the CISC instruction that was fetched. Once instructions are decoded, the resulting instructions are provided to an Issue Unit (ISU) 106. In one embodiment of the present invention, the IDU 104 provides decoded RX instructions to the ISU 106. Instruction groups being operated upon by processor 100 are maintained by use of a Global Completion Table (GCT) 114. Instructions to be processed are issued from the ISU 106 to various execution units, such as a Load Store Unit (LSU) 108, a Fixed Point Unit (FXU) 110, and a Floating Point Unit (FPU) 112. Further execution units are generally included examples of processor 100, but are not shown herein in order to focus on the relevant portions of processor 100 regarding one embodiment of the present invention. As is understood by practitioners of ordinary skill in the relevant arts, the Load Store Unit (LSU) 108, the Fixed Point Unit (FXU) 110, and the Floating Point Unit (FPU) of one embodiment are configured in an out-of-order processing pipeline architecture.

Figure 2:
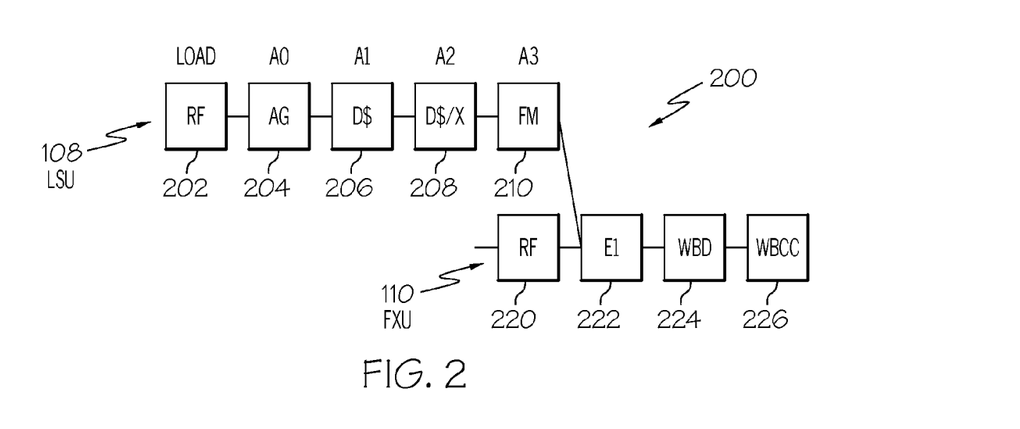
FIG. 2 illustrates the pipeline processing of complex instructions as performed by processor illustrated in FIG. 1, in accordance with one embodiment of the present invention.

FIG. 2 illustrates the pipeline processing 200 of a complex instruction as performed by processor 100 illustrated in FIG. 1, in accordance with one embodiment of the present invention. The pipeline processing 200 illustrates the processing performed by the LSU 108 and the FXU 110 of processor 100, as described above with regards to FIG. 1. As an execution example of one embodiment, as described in detail below, the ISU 106 of processor 100 issues the opcode for the RX instruction to both the LSU 108 and the FXU 110, separated by a suitable delay. The delay in one embodiment corresponds to a pre-determined processing pipeline length of the LSU 108. Thus, in one embodiment, a pre-determined operations code that represents the single RX instruction is used as corresponding RISC instruction opcodes that are accepted by both the LSU 108 and the FXU 110 to perform the respective instructions that are to be executed by the LSU 108 and FXU 110 to implement the processing of those units for the received CISC RX instruction.

The RX instruction of one embodiment is an arithmetic instruction with a first operand that is a register operand associated with a register of the processor. A second operand of the RX instruction specifies a memory location within memory accessible by the processor.

The pipeline processing 200 of a RX instruction begins with the processing by the LSU 108 that includes a Register File read (RF) stage 202. The RF stage 202 of one embodiment reads the base and index values and adds them to the displacement value. An Address Generation (AG) stage 204 generates the address of the memory to access to retrieve one operand of the RX instruction. A Data Cache (D$) stage 206 fetches the operand data from the memory cache and a Data Cache Transfer (D$/X) stage 208 transfers the cached data to the LSU 108. A formatting stage 120 210 formats the data produced by the LSU 108. As is clear from this illustration, the pre-determined processing pipeline length of the LSU 108 is four cycles. The ISU 106 of one embodiment delays, after issuing a load instruction to the LSU 108 corresponding to the received arithmetic RX instruction, for this four cycle pre-determined processing pipeline delay length of the LSU 108 before issuing an execution instruction to the FXU 110 that corresponds to the received arithmetic RX instruction. In one embodiment, the ISU 106 maintains a "dual issue control bit" that is set in response to receiving an RX instruction. The dual issue control bit indicates to the ISU 106 to, in response to accepting the arithmetic RX instruction, issue the load instruction corresponding to the arithmetic RX instruction to the LSU 108 and then delay for the pre-determined processing pipeline delay time period prior to issuing an execution instruction corresponding to the received arithmetic RX instruction to the FXU 100.

The FXU 110 of one embodiment receives the RX instruction four cycles after the LSU 108. This four cycle delay accommodates the above described four processing stages of the LSU that precede the availability of the output of the LSU 108 for this RX instruction. A FXU Register File read (RX) stage 220 of the FXU reads the other operand of the RX instruction from the architecture register file. An Execution Stage (μl) 222 executes the FXU operation. A Write Back data (WBd) stage 224 writes the output data of the RX instruction. A Write Back condition code (WBcc) stage 226 writes the condition code of the RX instruction, which indicates, for example, if the output is greater than, equal to, or less than zero.

Several other CISC instruction have a similar structure in that their execution involves cracking the CISC instruction by issuing one micro-op to a first execution unit to produce intermediate data and then that intermediate data is used by a second execution unit when executing a second micro-op to complete the execution of the CISC instruction. One embodiment of the present invention delays the issue of the second micro-op for a period of the expected execution time of the first micro-op by the first execution unit. Examples of CISC instruction categories of the z/Architecture that are able to be cracked at execution in a manner similar to that discussed below with regards to the RX instruction are as follows.

One category of instructions is register memory operations that utilize the processor architecture shown in FIG. 1. In register memory operations, a micro-op is issued to the LSU 108 to perform the cache access load (or store) and update a target register. In one case, the target register is same as the target register specified for the CISC instruction. A scratch general purpose register is used if the instruction does not have a register target (e.g. Register-memory compare instructions executed in FXU). A scratch Floating Point Register is used if the instruction does not have a register target (e.g. Register-memory compare instructions executed in a Binary Fixed Unit (BFU), not shown. The second micro-op is issued to a second execution unit, such as the (FXU or BFU) that sources the result of the execution of the first micro-op by the LSU 108.

Another category of instructions is Store instructions where no register saving is performed. In Store instructions, the first micro-op is issued to the first execution unit, such as the LSU 108, which performs memory address calculation and tests the cache memory line for exceptions, etc. The address that is determined by the first execution unit can be calculated differently depending on the instruction/operand format. Some formats may only specify a Base and a displacement fields (i.e., no Index fields), others may be relative to current instruction address (i.e., determined address equals the Instruction address of the store instruction+immediate field specified as part of the instruction text), and so forth.

The second micro-op is issued to the second execution unit, such as the FXU, which reads an operand from the register file, and transmits it to be stored in memory at the address determined by the first execution unit. The first execution unit reads operands from the register file used for address calculation, and the second execution unit reads an operand value from the register file to be stored, thereby enabling the same pipeline stage of each micro-op to be used for reading the register file.

A further category of instructions include shift/rotate instructions, which have no cache access and no saving of data into a register. In shift/rotate instructions, the issue of the first micro-op to the first execution unit, such as the LSU 108, performs an address generation, such as adding a displacement to a base address stored in a register. The generated address is itself used as a value upon which the shift/rotate amount determined. In one example, the shift/rotate amount is equal to the least significant 6 bits of the determined address. These 6 bits (or control bits formed from these bits) are saved as intermediate data and used in the Issue Queue position of the instruction. The second micro-op is issued to the second execution unit, such as the FXU 110, which uses these saved controls bits for instruction execution.

A further category of instructions is Control register manipulation, such as the z/Architecture instructions TRBIT and STFPC. The first micro-op to the first execution unit, such as the LSU 108 caused the first execution unit to read a control register from the processor's Recovery Unit (not shown) and saves it in a scratch register. The second micro-op is issued to the FXU 110, which reads the scratch register for data manipulation. These instructions are also able to use the processing described herein when another type of control register is read from the Recovery Unit (not shown) and then tested in the execution unit.

Another category of instruction is Fixed Point to Hex/Bin/Decimal floating point conversion instructions. These instructions convert a fixed point value in a general purpose register to one of a Hexadecimal, Binary, or Decimal Floating point value and save the result in a floating point register. These instructions issue a first micro-op to the FXU 110, which stores the value in a general purpose register into a scratch, or non-architected, floating point register. The scratch floating point register will become designated as the target register for the CISC instruction. A second micro-op is issued to the Binary Fixed Point Unit or the Decimal Fixed point unit (not shown), which reads the data from the scratch floating point register, does the conversion and updates the floating point register that was the scratch floating point register but is now designated as an architecture register that is the target register for the CISC instruction.

Another group of instructions include Hex/Bin/Decimal floating point conversion to fixed point conversion instructions. In this group of instructions, the source operand for the CISC instruction is in a floating point register and the target of the CISC instruction is a general purpose register. For this group of instructions, a first micro-op is issued to a Floating Point Unit (FPU) which converts data and places the result in a scratch floating point register. A second micro-op is issued to a fixed point unit, which places the result into a general purpose register from that scratch floating point register.

Figure 3:
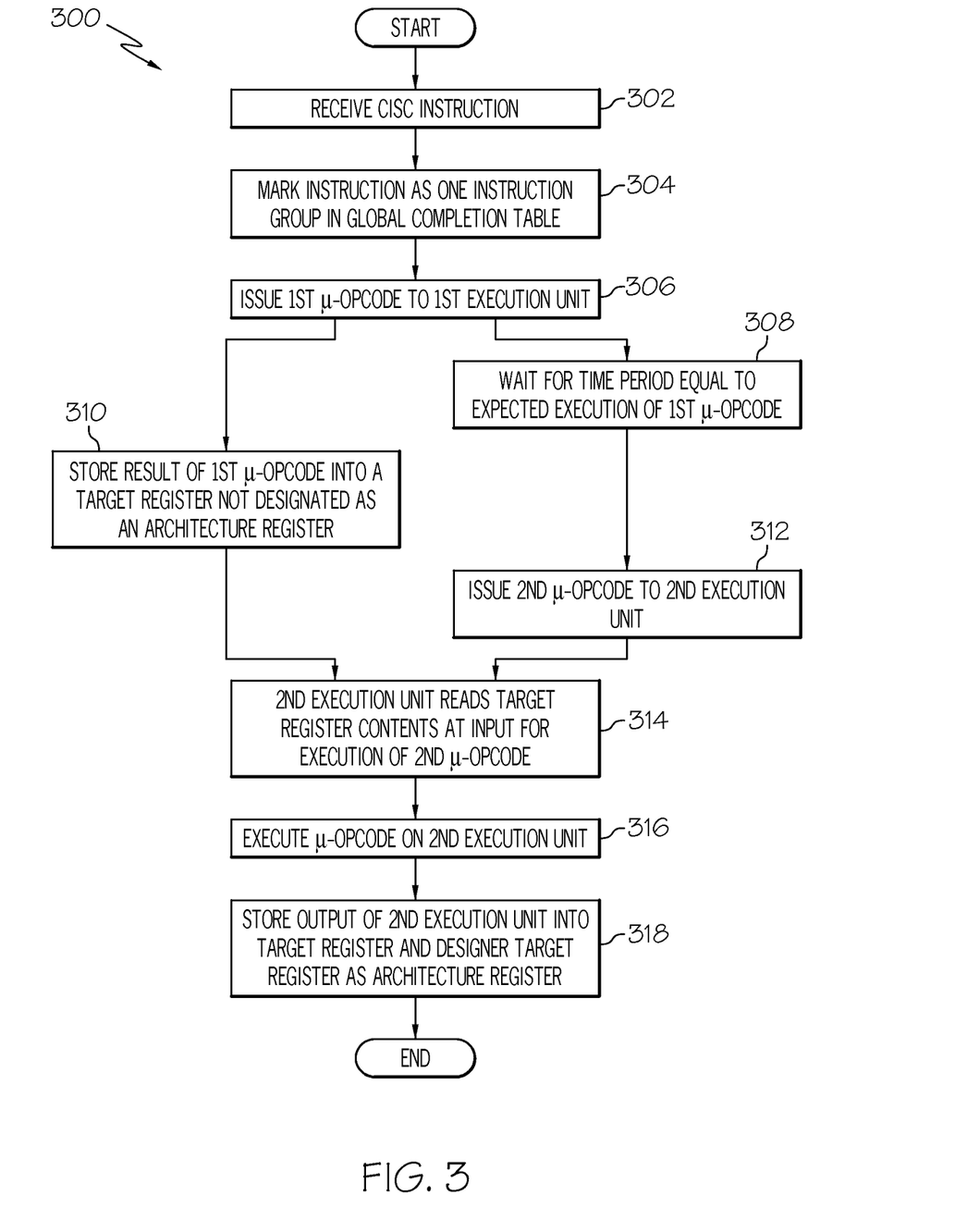
FIG. 3 illustrates a dual issue instruction processing flow, in accordance with one embodiment of the present invention.

FIG. 3 illustrates a dual issue instruction processing flow 300, in accordance with one embodiment of the present invention. The dual issue instruction processing flow 300 begins by receiving, at 302, a CISC instruction. As described above, in one embodiment a CISC instruction is received by an Instruction Fetch Unit (IFU) 102. The processing flow 300 continues by marking, at 304, the micro-ops corresponding to the CISC instruction as a single entry in the Global Completion Table (GCT) 114.

The processing continues to issue, at 306, a first micro-op to a first execution unit, such as the Load Store Unit (LSU) 108. The processing flow 300 continues by waiting, at 308, for a count equal to the pipeline length of the processing of the first micro-op by the LSU 108. In one example of one embodiment, the LSU is the first execution unit and has a pipeline length is equal to four (4) processing cycles. During the wait of this number of cycles, the first execution unit, e.g., the LSU 108 is processing the first micro-op. After the wait, the first execution unit, e.g., the LSU 108, stores, at 310, the result of the first micro-op's execution into a register that is not designated as an architecture register, i.e., it is a scratch register. As described below, this register will be reused as the target for the execution of a second micro-op and will then be designated as an architecture register of the processor for the CISC instruction output. One embodiment of the present invention stores the output of the execution of the first micro-op into a register that is not a processor architecture register to conserve the processing overhead associated with using architecture registers. This register will be allocated as a processor architecture register upon completion of the CISC instruction to allow for proper operation upon the result of the CISC instruction.

The processing flow 300 continues after waiting, at 308, for the time period by issuing, at 312, the second micro-op to a second execution unit, which can be, for example, the FXU 110, the FPU 112 or other execution unit of the processor 100. This issuing occurs after the wait described above and is therefore performed when the processing of the first execution unit is expected to have completed execution of the first micro-op for this CISC instruction. Of course, execution of the first micro-op is dependent upon available resources and may not have completed by the expected time. Based upon the dependency of the completion of the first micro-op processing by the first execution unit and the availability of the intermediate data therefrom, the second execution unit reads, at 314, the output of the first execution unit from the target register into which the first execution unit stored its output, as described above. This reading is also performed in response to the issuing, at 312, of the second micro-op to the second execution unit. The second executing unit proceeds to execute, at 316, the second micro-op. The second execution unit then stores, at 318, the output of the execution of the second micro-op to produce a result for the CISC instruction. The processing then ends.

Figure 5:
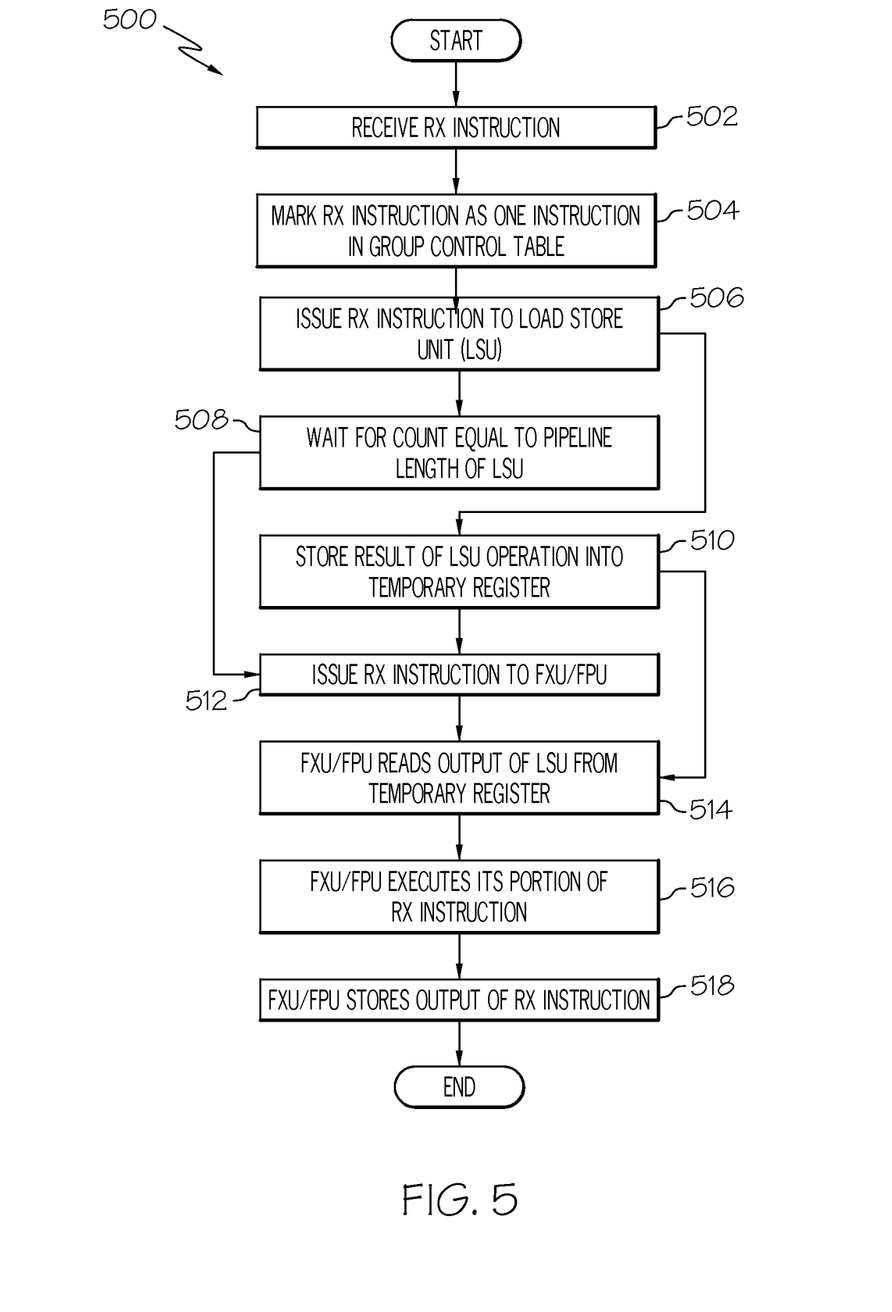
FIG. 5 illustrates a specific example of a dual-issue instruction processing for an RX instruction processing flow, in accordance with one embodiment of the present invention.

FIG. 5 illustrates a specific example of a dual-issue instruction processing for an RX instruction processing flow 500, in accordance with one embodiment of the present invention. The RX instruction processing flow 500 begins by receiving, at 502, an RX instruction. As described above, in one embodiment an RX instruction if received by an Instruction Fetch Unit (IFU) 102. The processing flow 500 continues by marking, at 504, the RX instruction as a single entry in the Global Completion Table (GCT) 114.

The processing continues to issue, at 506, the RX instruction to the Load Store Unit (LSU) 108. The processing flow 500 continues by waiting, at 508, for a count equal to the pipeline length of the processing of the first micro-op by the LSU 108. In one embodiment, the LSU pipeline length is equal to four (4) processing cycles. During the wait of this number of cycles, the LSU is processing the RX instruction. After the wait, the LSU stores, at 510, the result of the LSU operation into a register that will be the target output register for the RX instruction. One embodiment of the present invention stores the LSU output into a register that is not a processor architecture register at the time of completion of execution by the LSU 108 to conserve the processing overhead associated with using architecture registers. This register will be allocated as an processor architecture register upon completion of the RX instruction to allow for proper operation upon the result of the RX instruction.

The processing flow 500 continues by issuing, at 512, the RX instruction to either the FXU 110 or the FPU 112. Fixed point instructions are issued to the FXU 110, and floating point instructions are issued to the FPU 112. This issuing occurs after the wait described above and is therefore performed when the processing of the LSU 108 for this RX instruction is completed and the LSU output data is ready. The FXU 110 or FPU 112, depending on the type of operation being executed, reads, at 514, the output of the Load Store Unit (LSU) 108 from the target register into which the LSU stored its output, as described above. The FXU 110 or FPU 112 proceeds to execute, at 516, its portion of the RX instruction. The FXU 110 or FPU 112 then stores, at 518, the output of the RX instruction to produce a result of the execution instruction from the arithmetic processor. The processing then ends.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
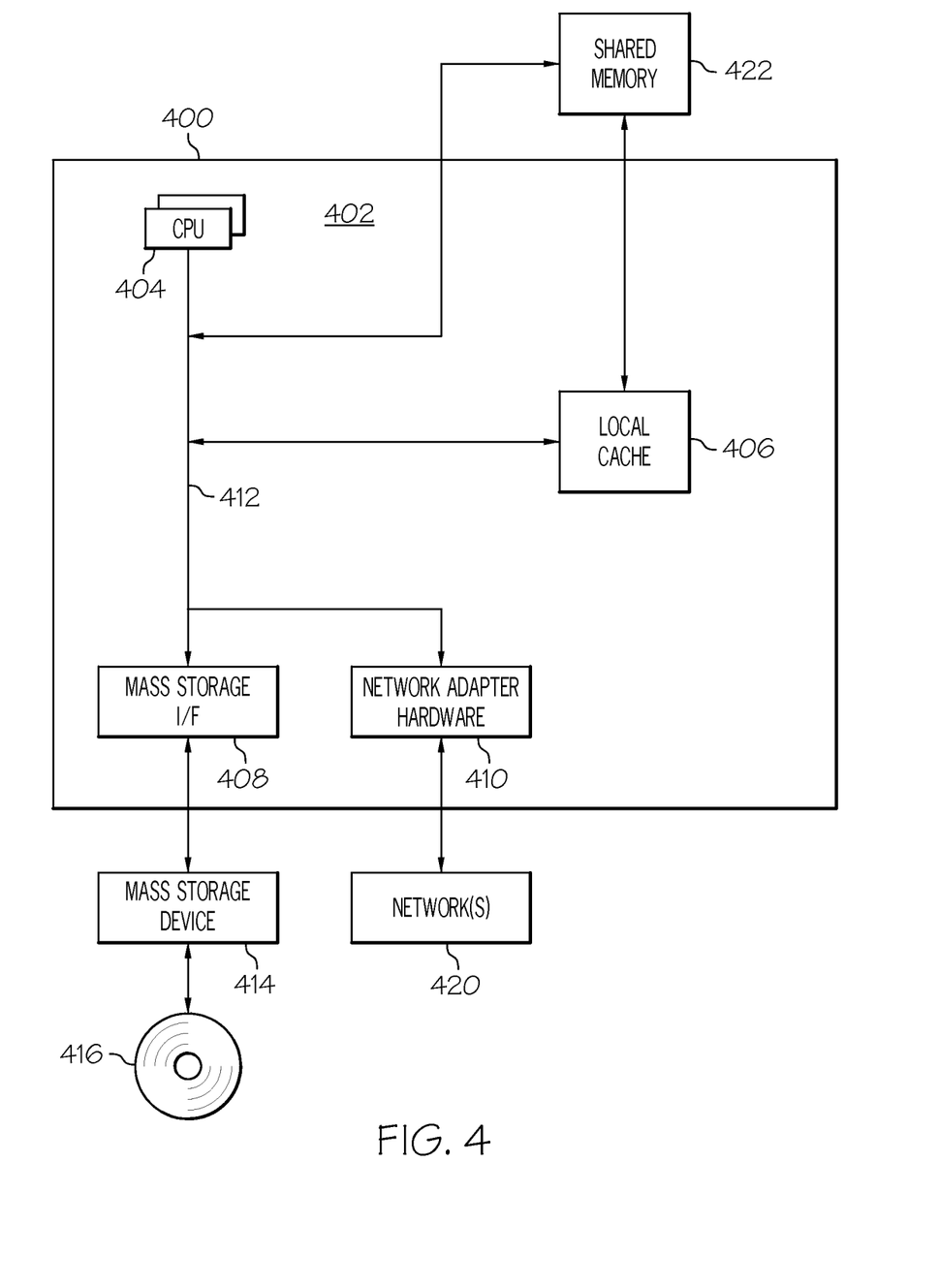
FIG. 4 is a block diagram illustrating an information processing system according to one embodiment of the present invention.

Referring now to FIG. 4, which is a block diagram illustrating an information processing system 400 that can be utilized in conjunction with processor 100 discussed above with respect to FIG. 1. The information processing system 400 is based upon a suitably configured processing system adapted to implement one or more embodiments of the present invention. Similarly, any suitably configured processing system can be used as the information processing system 400 by embodiments of the present invention.

The information processing system 400 includes a computer 402. The computer 402 has a processor(s) 404 that is connected to a local cache memory 406, shared memory 422, mass storage interface 408, and network adapter hardware 410. A system bus 412 interconnects these system components.

The mass storage interface 408 is used to connect mass storage devices, such as data storage device 414, to the information processing system 400. One specific type of data storage device is an optical drive such as a CD/DVD drive, which may be used to store data to and read data from a computer readable medium or storage product such as (but not limited to) a CD/DVD 416. Another type of data storage device is a data storage device configured to support, for example, NTFS type file system operations.

An operating system (not shown) included in the shared memory 422 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 400. The network adapter hardware 410 in one embodiment provides network communications interfaces to one or more networks 420. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for issuing a processor instruction to multiple processing sections, the method comprising:
    accepting, at an instruction issue unit within a processor, an instruction that is to be issued as a first micro-op to a first execution unit of the processor and a second micro-op to a second execution unit of the processor, the first micro-op causing the first execution unit to determine intermediate data to be provided to the second execution unit for use in executing the second micro-op, the second micro-op being of a different instruction type than the first micro-op, the second execution unit being configured to execute instructions of a different type than the first execution unit, the processor comprising an out-of-order processing pipeline architecture;
    assigning, by the instruction issue unit, a single issue queue entry in an issue queue to the instruction, the single issue queue entry comprising both the first and second micro-ops;
    issuing, by the instruction issue unit in response to accepting the instruction, the first micro-op to the first execution unit, the first execution unit having a defined processing pipeline length;
    configuring, based on the issuing, an instruction issue delay for the instruction issue unit, the instruction issue delay being configured for a time delay duration extending to a time after issuing the first micro-op that corresponds to a processing pipeline length of the first execution unit;
    determining, by the instruction issue unit based on the configuring, expiration of the instruction issue delay;
    issuing, by the instruction issue unit based on the expiration of the instruction issue delay, the second micro-op to the second execution unit;
    executing, based on issuing the second micro-op and based upon completion of executing the first micro-op by the first execution unit, the second micro-op by the second execution unit using the intermediate data; and
    producing, by the processor, a result produced by the executing the second micro-op.

2. The method of claim 1, the instruction being represented as a pre-determined operations code,
    the first execution unit accepting the pre-determined operations code as the first micro-op, and
    the second execution unit also accepting the pre-determined operations code as the second micro-op.

3. The method of claim 1, further comprising:
    maintaining, by the processor, a dual issue control bit in the issue queue, the dual issue control bit being set in response to accepting the instruction and indicating to the issue unit to perform the issuing the first micro-op, the configuring, the determining, and the issuing the second micro-op in response to accepting the instruction.

4. The method of claim 1, wherein the producing a result produced by the executing the second micro-op comprises storing the result into a target output register,
    the method further comprising:
    storing the intermediate data into the target output register for the instruction, and
    the executing the second micro-op comprising retrieving the intermediate data from the target output register for the instruction.

5. The method of claim 4, the storing the intermediate data into the target output register for the instruction being different than processor architecture registers at the time of the storing.

6. The method of claim 4, the executing the first micro-op comprising determining an address of data to be used in conjunction with the executing the second micro-op,
    the intermediate data comprising data stored at the address, and
    the executing the second micro-op comprising using the data stored at the address.

7. A system for issuing a processor instruction to multiple processing sections, the system comprising:
    a first execution unit of a processor having a pre-determined processing pipeline length and configured to execute a first micro-operations code corresponding to a complex instruction for the processor, the first execution unit having a defined processing pipeline length;
    a second execution unit of the processor that is separate from the first execution unit and configured to execute a second micro-op corresponding to the complex instruction and operating upon data retrieved based upon the first micro-op, the second micro-op being of a different instruction type than the first micro-op, the first execution unit and the second execution unit being arranged in an out-of-order processing pipeline architecture, the second execution unit being configured to execute instructions of a different type than the first execution unit;
    an instruction issue unit coupled to the first execution unit and the second execution unit, the instruction issue unit configured to:
        accept the complex instruction for the processor, the complex instruction comprising:
            a first operand comprising a register operand associated with a register of the processor, and
            a second operand comprising a memory location within memory accessible by the processor;
        assigning, by the instruction issue unit, a single issue queue entry in an issue queue to the instruction, the single issue queue entry comprising both the first and second micro-ops;
        issue to the first execution unit, the first micro-op corresponding to the complex instruction so as to cause the first execution unit to produce intermediate data;
        configure, based on the issue to the first execution unit, an instruction issue delay for the instruction issue unit, the instruction issue delay being configured for a time delay duration extending to a time after issuing the first micro-op that corresponds to a processing pipeline length of the first execution unit;
        determine based on the configuring an instruction issue delay, expiration of the instruction issue delay; and
        issue, based upon the expiration of the instruction issue delay, a second micro-op to the second execution unit so as to cause the second execution unit to use the intermediate data to produce a result; and
    a data output configured to produce the result,
    wherein the second execution unit is configured to execute the second micro-op based upon an issuing of the second micro-op and based upon completion of executing the first micro-op by the first execution unit.

8. The system of claim 7, further comprising:
    a Global Completion Table, the issue unit further capable of marking the complex instruction as a single entry in the Global Completion Table.

9. The system of claim 7, the complex instruction being represented as a pre-determined operations code,
the first execution unit configured to accept the pre-determined operations code as the first micro-op, and
the second execution unit also configured to accept the pre-determined operations code as the second micro-op.

10. The system of claim 7, the issue unit further configured to:
maintain a dual issue control bit within the issue queue, the issue control bit being set in response to an acceptance of the complex instruction,
the issue unit being further configured to issue the first micro-op, configure the delay time duration, and issue the second micro-op in response to the acceptance of the complex instruction.

11. The system of claim 7,
the first execution unit configured to store the intermediate data into a target register for the instruction, and
the second execution unit further configured to retrieve the intermediate data from the target register.

12. The system of claim 11, the target register being a target register of the complex instruction.

13. A computer program product for issuing a processor instruction to multiple processing sections, the computer program product comprising:
a non-transitory computer readable storage device having computer readable program code embodied therewith, the computer readable program code comprising:
computer readable program code configured to accept an instruction that is to be issued as a first micro-op to a first execution unit of the processor and a second micro-op to a second execution unit of the processor, the first micro-op causing the first execution unit to determine intermediate data to be provided to the second execution unit for use in executing the second micro-op, the second micro-op being of a different instruction type than the first micro-op, the second execution unit being configured to execute instructions of a different type than the first execution unit, the processor comprising an out-of-order processing pipeline architecture;
computer readable program code configured to assigning, by the instruction issue unit, a single issue queue entry in an issue queue to the instruction, the single issue queue entry comprising both the first and second micro-ops;
computer readable program code configured to issue the first micro-op to the first execution unit, the first execution unit having a defined processing pipeline length;
computer readable program code configured to configure, based on the issue, an instruction issue delay, the instruction issue delay being configured for a time delay duration extending to a time after issuing the first micro-op that corresponds to a processing pipeline length of the first execution unit;
computer readable program code configured to determine based on the configuring, expiration of the instruction issue delay;
computer readable program code configured to issue, based upon the expiration of the instruction issue delay, the second micro-op to the second execution unit;
computer readable program code configured to execute, based on issuing the second micro-op and based upon completion of executing the first micro-op by the first execution unit, the second micro-op by the second execution unit using the intermediate data; and
computer readable program code configured to produce a result produced by the executing the second micro-op.

14. The computer program product of claim 13, the computer readable program code further comprising:
computer readable program code configured to mark the instruction in a Global Completion Table as a single entry.

15. The computer program product of claim 13, the instruction being represented as a pre-determined operations code,
the first execution unit accepting the pre-determined operations code as the first micro-op, and
the second execution unit also accepting the pre-determined operations code as the second micro-op.

16. The computer program product of claim 13, the computer readable program code further comprising:
computer readable program code configured to maintain a dual issue control bit within the issue queue, the dual issue control bit being set in response to accepting the instruction and wherein the computer readable program code is further configured to issue the first micro-op, configure, determine, and issue the second micro-op based on the dual issue control bit.

17. The computer program product of claim 13, wherein the computer readable program code configured to produce a result comprises computer readable program code configured to store the result into a target output register, and
the computer readable program code further comprising:
computer readable program code configured to store the intermediate data into the target output register for the instruction, and
the computer readable program code configured to execute the second micro-op comprising retrieving the intermediate data from the target output register for the instruction.

18. The computer program product of claim 17, the target register being different than processor architecture registers at the time of the storing.

19. The method of claim 1, wherein the determining the expiration comprises counting a number of cycles corresponding to a number of cycles corresponding to a pre-determined pipeline processing length for first execution unit executing the first micro-op.

* * * * *